(12) United States Patent
Kawada et al.

(10) Patent No.: US 7,794,810 B2
(45) Date of Patent: Sep. 14, 2010

(54) ADHESIVE TAPE ROLL

(75) Inventors: Tsutomu Kawada, Chuo-ku (JP); Teiji Sakashita, Chuo-ku (JP); Tomio Kakita, Chuo-ku (JP); Satoshi Taguchi, Chuo-ku (JP); Hiroyuki Noma, Chuo-ku (JP)

(73) Assignee: Kabushiki Kaisha Nitoms, Tokyo (JP)

( * ) Notice: Subject to any disclaimer, the term of this patent is extended or adjusted under 35 U.S.C. 154(b) by 466 days.

(21) Appl. No.: 11/641,081

(22) Filed: Dec. 18, 2006

(65) Prior Publication Data

US 2008/0145586 A1 Jun. 19, 2008

(51) Int. Cl.
*B32B 9/00* (2006.01)
*B65D 65/28* (2006.01)
*A47L 13/00* (2006.01)
*A47L 25/00* (2006.01)

(52) U.S. Cl. .................... 428/40.1; 428/42.2; 428/42.3; 428/43; 428/343; 428/906; 15/104.001; 15/104.002

(58) Field of Classification Search ................ 428/40.1, 428/41.8, 42.1, 42.2, 42.3, 43, 343, 960
See application file for complete search history.

(56) References Cited

U.S. PATENT DOCUMENTS

| | | | | | |
|---|---|---|---|---|---|
| 3,312,005 | A | * | 4/1967 | McElroy | 40/638 |
| 3,592,722 | A | * | 7/1971 | Morgan | 428/198 |
| 4,460,634 | A | * | 7/1984 | Hasegawa | 428/124 |
| 4,556,595 | A | * | 12/1985 | Ochi | 428/143 |
| 4,735,837 | A | * | 4/1988 | Miyasaka et al. | 428/40.2 |
| 5,008,139 | A | * | 4/1991 | Ochi et al. | 428/40.2 |
| 5,336,541 | A | * | 8/1994 | Kobayashi | 428/41.8 |
| 5,344,693 | A | * | 9/1994 | Sanders | 428/167 |
| 5,378,301 | A | * | 1/1995 | Boreali et al. | 156/344 |
| 6,270,870 | B1 | * | 8/2001 | Chess | 428/40.1 |
| 6,565,697 | B1 | * | 5/2003 | Maercklein | 156/289 |
| 6,858,285 | B1 | * | 2/2005 | Hamilton et al. | 428/174 |
| 7,332,205 | B2 | * | 2/2008 | Hannington et al. | 428/40.1 |

FOREIGN PATENT DOCUMENTS

JP U H03-10858 2/1991

* cited by examiner

*Primary Examiner*—Patricia L Nordmeyer
(74) *Attorney, Agent, or Firm*—Manabu Kanesaka

(57) ABSTRACT

An adhesive tape roll at lower cost without reducing cleaning ability is provided. A release material layer 41 as release means is provided in a streak shape on an adhesive surface 22 of an adhesive tape 2 with the adhesive surface 22 formed on one surface of the base material 21.

1 Claim, 2 Drawing Sheets

ADHESIVE TAPE ROLL

TECHNICAL FIELD

The present invention relates to an adhesive tape roll for cleaning which is wound in a roll shape so that an adhesive surface faces a right side, and more specifically, to a technique of producing an adhesive tape roll which provides for both improved functionality of the adhesive tape and reduced production cost.

BACKGROUND ART

As shown in, for example, Patent Document 1 (Japanese Utility Model Application No. 2521127), an adhesive tape roll for cleaning is formed by winding an adhesive tape with an adhesive surface formed on one surface of a band-shaped base material in a roll shape so that its adhesive surface faces a right side, and by fitting it to an exclusive fixture (see FIG. 3B in Patent Document 1) and rolling it with its adhesive surface in contact with a surface to be cleaned such as a floor, dust on the surface to be cleaned can be caught with the adhesive surface.

The other surface (non-adhesive surface) of the base material is provided with a laminate film for reinforcing the base material, and further under it, a release treatment surface coated with a release material such as a silicon resin is provided. The release treatment surface is a contact surface with which the adhesive surface of the adhesive tape on the lower layer is in contact when the adhesive tape is stacked into a roll shape, and is provided so that the base material is not broken by the adhesive surface on the lower layer when the adhesive tape on the outermost layer is peeled off.

However, conventionally, the release treatment surface has to be always provided to stack the adhesive tape. Therefore, the material cost and the production cost have been high correspondingly. Further, if the rewinding force (the resistance force when rewound) is too small, the rewinding force is surpassed by the adhesion between the adhesive tape and the floor surface when the adhesive tape roll is rolled on the floor surface, and a so-called railing phenomenon in which the adhesive tape sticks to the floor surface is sometimes caused. Thus, care is required in the design of the release treatment surface.

SUMMARY OF THE INVENTION

The present invention is made for solving the above described problem, and an object of the present invention is to provide an adhesive tape roll at lower cost without reducing its cleaning ability.

In order to attain the above described object, the present invention includes several characteristics shown as follows. Namely, in an adhesive tape roll which is formed by winding an adhesive tape with an adhesive surface formed on one surface of a base material so that its adhesive surface faces a right side, the present invention is characterized in that the above described adhesive surface is provided with release means with respect to the other surface of the above described base material.

A more preferable mode is characterized in that an adhesive material layer forming the above described adhesive surface is provided on one surface of the above described base material and a release material layer as the above described release means is partially provided on the above described adhesive layer.

According to this, as a result that the release means with the release material layer formed on the adhesive surface is provided, the release treatment surface as in the conventional tape roll does not have to be provided on the other surface of the base material, and the adhesive tape roll can be produced at lower cost.

More preferably, the above described release material layer is characterized by having an occupation ratio with respect to the above described adhesive surface per unit area of 5% or more and 50% or less.

According to this, when the occupied area of the release material layer is less than 5%, the area of the release material layer is too small. Therefore, the base material and the adhesive surface stick to each other, and there is the fear of occurrence of base material breakage when it is peeled off. When the occupied area is larger than 50% on the other hand, contact of the adhesive surface and the surface to be cleaned is inhibited, and therefore, there is not only the fear of reduction in cleaning ability but also the fear of causing a railing phenomenon.

The above described release material layer is characterized by being provided in a line shape, a lattice shape, a wave shape and/or a dot shape.

According to this, by providing the release material layer in the line shape, the dot shape or the wave shape, the adhesive action and the release action can be evenly distributed.

The above described release material layer is characterized by being composed of a synthetic resin material of rubber, acryl, urethane, EVA and/or amorphous poly α olefin as a main component.

According to this, since the release material layer is composed of rubber, acryl, urethane, EVA, and/or amorphous poly α olefin as the main component, not only the release action can be effectively kept, but also dust entering the uneven surface can be reliably captured by generating proper cushioning properties at the time of cleaning.

The above described release material layer is characterized by having a width of 1 mm or less, and thickness of 30 to 120 μm.

According to this, if the width of the release layer is larger than 1 mm, contact of the adhesive surface and the surface to be cleaned is inhibited, and therefore, there is the fear of excessively reducing the adhesion. When the thickness is smaller than 30 μm, the adhesive surface sticks to the base material on the upper layer too firmly, and therefore, there arises the fear of causing breakage of the base material. When it is larger than 120 μm on the other hand, there arises the fear that the adhesion reduces too much.

The above described release material layer is characterized by including very small adhesiveness having a holding force necessary for supporting at least the other surface of the above described base material which is opposed thereto.

According to this, the release material layer includes very small adhesiveness having the holding force necessary for supporting the other surface of the base material, and thereby, the railing phenomenon, which occurs as a result of losing the balance of the adhesion to the surface to be cleaned and the rewinding force, can be prevented.

DETAILED DESCRIPTION

Figure 1:
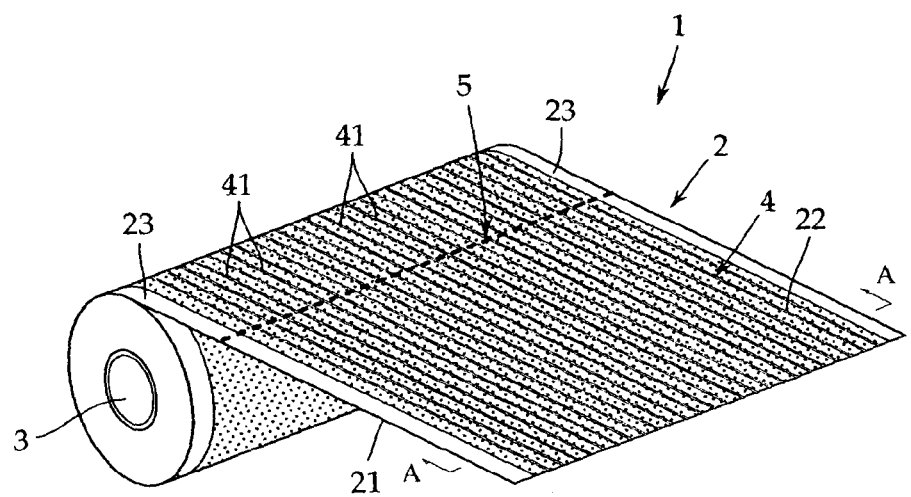
FIG. 1 is a perspective view of an adhesive tape roll according to one embodiment of the present invention.

Next, an embodiment of the present invention will be described with reference to the drawings, but the present invention is not limited to this. FIG. 1 is a perspective view of an adhesive tape roll according to one embodiment of the present invention, and FIG. 2 is a sectional view taken along line A-A of it.

An adhesive tape roll 1 is constituted of what is made by winding an adhesive tape 2 with an adhesive surface 22 formed on one surface of a tape-shaped base material 21 in a roll shape along a core 3 so that its adhesive surface 22 faces a right side (top surface side in FIG. 1).

A core made of cardboard is usually used for the core 3, but other materials than this, such as a synthetic resin may be used. A so-called coreless type in which only the adhesive tape 2 is wound into a roll shape without using the core 3 may be adopted, and in the present invention, the core 3 is strictly an optional component.

Figure 2:
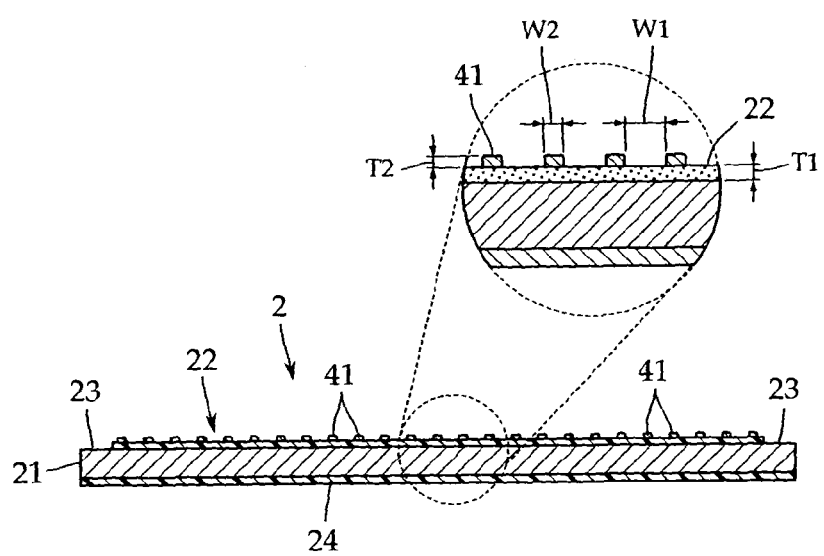
FIG. 2 is a sectional view of the adhesive tape taken along line A-A.

The base material 21 is made of, for example, paper, and as shown in FIG. 2, the adhesive surface 22 coated with an adhesive material is formed on one surface (front surface). In this example, the adhesive agent is composed of an SIS (styrene-isoprene-styrene) adhesive material to which various additive agents such as tackifier, naphthene oil and an age resistor is added, but the kind of the adhesive material may be selected optionally from strong adhesiveness, weak adhesiveness and the like in accordance with the surface to be cleaned (for example, flooring, a carpet or the like) for which it is used. A resin film and a non-woven fabric may be used other than paper as the material of the base material 21.

The adhesive surface 22 is constituted of an adhesive material layer with one surface of the base material 21 coated with an adhesive material all over with a uniform thickness T1, and in this example, the adhesive material is coated so that the thickness T1 of the adhesive material layer becomes 15 to 20 µm.

Non-adhesive portions (dry edges) 23 and 23 which are not coated with the adhesive material are provided at both ends of the adhesive surface 22 of the base material 21, and in this embodiment, non-adhesive portions 23 and 23 are strictly optional components.

Release means 4 is provided on the adhesive surface 22 so that the adhesive tape 2 on the upper layer side and the adhesive tape 2 on the lower layer side do not stick to each other. As shown in FIG. 2, the release means 4 has release material layers 41 formed in streak shapes in parallel along the feeding direction of the adhesive tape 2 on the adhesive surface 22, and a number of them are disposed with predetermined spaces (space W1=1.7 mm in this example).

The release material layer 41 preferably has a width W2 of 1 mm or less and a thickness T2 of 30 to 120 µm. Namely, if the width of the release material layer 41 is larger than 1 mm, there is the fear of the adhesion reduces too much. If the thickness of the release material layer 41 is smaller than 30 µm, the adhesive surface sticks to the base material on the upper layer too firmly to cause the fear of occurrence of breakage of the base material. If it is larger than 120 µm on the other hand, there is the fear that adhesion reduces too much.

In this embodiment, the release material layer 41 is formed into the streak shape along the feeding direction of the adhesive tape 2, but other than this, it may be in a lattice shape, or may be provided to scatter in a dot form, for example. Namely, as long as the occupation ratio to the adhesive surface 22 per unit area is 5% or more and 50% or less (more preferably, 10% or more and 30% or less), the form thereof may be optional in accordance with the specifications.

According to the above, when the occupied area of the release material layer 41 is less than 5%, the release material layer 41 is too small, the base material sticks to the adhesive surface, and when it is peeled off, base material breakage may be caused. If it is larger than 50% on the other hand, there arises not only the fear of reducing the cleaning ability since the adhesion to the surface to be cleaned is too small, but also the fear of causing a railing phenomenon.

In this example, the release material layer 41 is constituted of a rubber material such as, for example, CEBC (olefin crystal: ethylene: butylene: olefin crystal block copolymer) as a main component, which is doped with a very small amount of an SIS polymer to enhance affinity with the adhesive surface 22, and is further doped with various additives such as tackifier and paraffin oil.

In this example, the release material layer 41 obtains slight adhesiveness by using the additive such as paraffin oil, but other than this, it may use a mechanical method such as microbaloon mixing, and mechanical foaming using $N_2$ gas or $CO_2$ gas. Further as other methods, mixing of elastic powder, doping an acrylic pressure sensitive adhesive material with a plasticizer and the like may be adopted.

A laminated film 24 for reinforcing the base material 21 is provided on the other surface (back surface) of the base material 21. In this example, the laminated film 24 is composed of a thin film of polyethylene, and is integrally provided on the base material 21. The laminated film 24 may not be used by controlling the adhesiveness of the release material layer 41. In the case of the base material 21 of a plastic film, the laminated film 24 is not required.

Referring to FIG. 1 again, the adhesive tape 2 is provided with a cut line 5 for cutting at substantially each lap length. In the present invention, the cut line 5 refers to cutting means which is used for cutting the adhesive tape 2 along the width direction, and includes, for example, arrangement of long holes or wave-shaped slits, and intermittent slits such as perforation.

In this embodiment, the cut line 5 is provided substantially parallel with and along the width direction of the adhesive tape 2, but other than this, it may be formed in the oblique direction. Further, it may be a short cut line to be a starting point of cutting provided at a part of the end portion of the adhesive tape 2.

Figure 3:
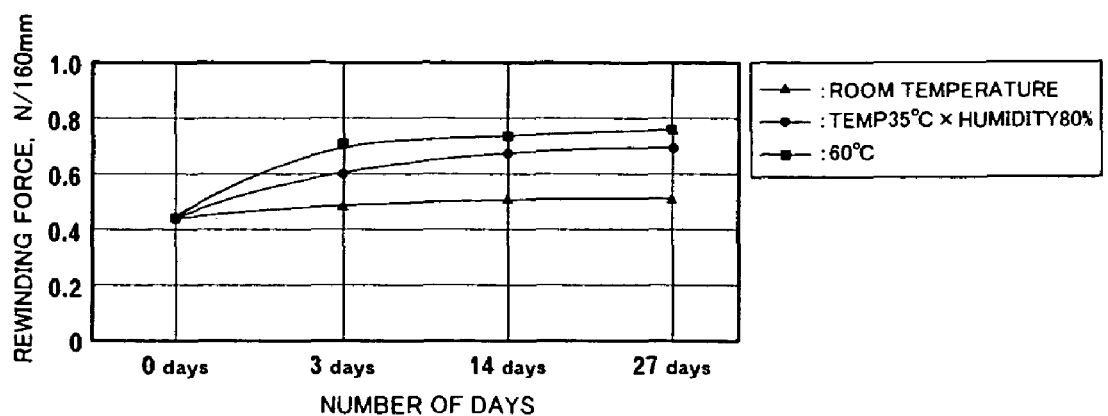
FIG. 3 is a graph showing the variation per day of the rewinding force of the adhesive tape.

Next, the concrete characteristics of the release material layer 41 will be described. FIG. 3 is a graph showing the variation per day of the rewinding force of the release material which composes the release material layer 41, and Table 1 is the table which summarizes the evaluation result.

TABLE 1

| STANDING CONDITION | | NUMBER OF DAYS | | | |
|---|---|---|---|---|---|
| | | BLANK | 3 DAYS | 14 DAYS | 27 DAYS |
| ROOM TEMPERATURE | ONLY ADHESIVE MATERIAL LAYER | BASE MATERIAL BREAKAGE | BASE MATERIAL BREAKAGE | BASE MATERIAL BREAKAGE | BASE MATERIAL BREAKAGE |
| | ADHESIVE MATERIAL LAYER + RELEASE MATERIAL LAYER | 0.44 | 0.48 | 0.53 | 0.53 |
| 35° C. × HUMIDITY 80% | ADHESIVE MATERIAL LAYER + RELEASE MATERIAL LAYER | 0.44 | 0.60 | 0.66 | 0.68 |
| 60° C. | ADHESIVE MATERIAL LAYER + RELEASE MATERIAL LAYER | 0.44 | 0.71 | 0.73 | 0.78 |

(N/160 mm)

The rewinding force means the adhesion in the interface between the adhesive surface 22 and the non-adhesive surface (surface of the laminated film 24). In this example, the adhesive tape composed similarly to FIG. 1 was prepared, and was left standing at each temperature for predetermined days, and thereafter, its rewinding forces were measured.

Comparing the release material and the adhesive material about the rewinding force, in the case with only the adhesive material, the adhesive material completely stuck to the base material, and when it is peeled off, base material breakage was caused. On the other hand, the adhesive tape including the release material layer can permanently obtain the stable rewinding force at a room temperature, an intermediate temperature (35° C.) and a high temperature (60° C.), and by providing it on the adhesive layer, sufficient release action can be obtained. Since in the case with only the adhesive material, adhesiveness onto the base material back surface is strong, and base material breakage occurs from the blank, it is not shown in each graph.

Figure 4:
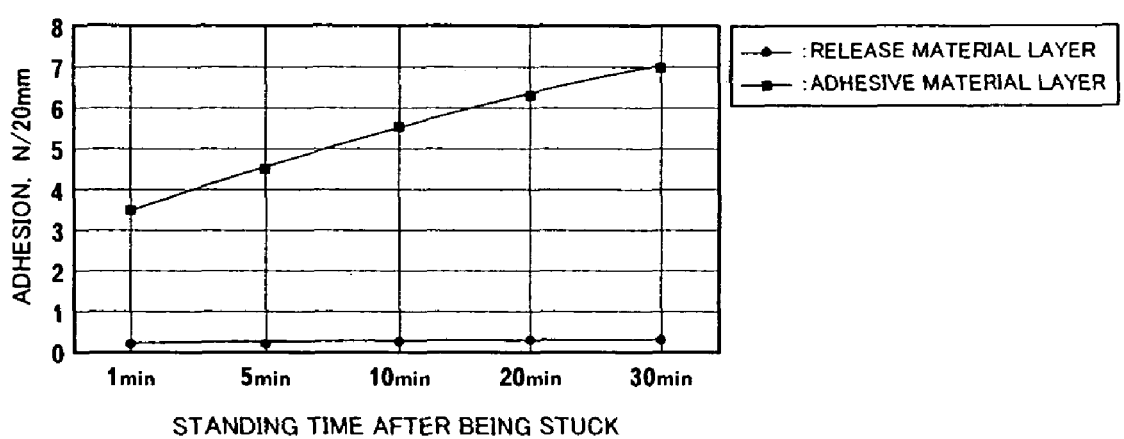
FIG. 4 is a graph showing the changes in adhesion of the adhesive material and the release material.

Next, FIG. 4 is a graph showing changes in the adhesion of the release material and the adhesive material, and Table 2 is the table of the summary of the evaluation result.

TABLE 2

| | STANDING TIME | | | | |
|---|---|---|---|---|---|
| SAMPLE | 1 MIN | 5 MINS | 10 MINS | 20 MINS | 30 MINS |
| ADHESIVE MATERIAL LAYER | 3.50 | 4.50 | 5.60 | 6.20 | 7.00 |
| RELEASE MATERIAL LAYER | 0.24 | 0.24 | 0.27 | 0.28 | 0.28 |

(N/20 mm)

The adhesion means the interface adhesion between the adhesive surface and the contact surface, and in this example, it means peel adhesion at 180° in conformity with JIS (Japanese Industrial Standards)—Z0237 after the adhesive tape is stuck to a stainless plate and is left for a predetermined time.

According to this, it is found out that since the adhesive material is generally of a pressure sensitive type, the adhesiveness gradually increases after being stuck thereto, but the release material always keeps a substantially constant small adhesive state, and a sufficient release effect with respect to the base material is obtained.

In this example, the adhesive tape 2 is wound in the roll shape, but may be provided to stack, for example, sheet bodies, and as long as the adhesive tapes have the structure in which the bottom surface of the self-propelled adhesive tape is stacked on the adhesive surface of the adhesive tape, the present invention is applicable to the adhesive tapes in all forms.

The present application is based on, and claims priority from, Japanese Applications Serial Number JP2005-315992, filed Oct. 31, 2005 the disclosure of which is hereby incorporated by reference herein in its entirety.

The invention claimed is:

1. An adhesive tape roll cleaner, comprising:
   a paper base material,
   an adhesive material deposited on one surface of the base material,
   a film laminated on the base material at a side opposite to the adhesive material, and
   a release material layer partially deposited on the adhesive material in an occupation ratio with respect to the adhesive surface per unit area of more than 5% and less than 50%,
   wherein the base material is rolled continuously with the adhesive material having the release material layer facing outwardly,
   the release material layer has an adhesiveness less than that of the adhesive material to hold the base material in a rolled state and a release effect with respect to the base material so that when the base material is rolled, the release material releasably adheres to the film,
   the base material, adhesive material, film and release material layer have cut lines spaced from each other perpendicular to a longitudinal direction of the base material to remove a part of the base material with the adhesive material, film and release material, and
   the release material layer is made of a rubber material and additives to enhance affinity with the adhesive material and to provide adhesiveness to the release material layer.

* * * * *